United States Patent
Park et al.

(10) Patent No.: US 11,561,751 B2
(45) Date of Patent: *Jan. 24, 2023

(54) DISPLAY DEVICE INCLUDING PLURALITY OF MODULES AND CONTROL METHOD THEREFOR

(71) Applicant: SAMSUNG ELECTRONICS CO., LTD., Suwon-si (KR)

(72) Inventors: Ji-yong Park, Suwon-si (KR); Min-jung Kim, Seoul (KR); Sang-kyun Im, Seoul (KR); Young-hoon Cho, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/320,349

(22) Filed: May 14, 2021

(65) Prior Publication Data

US 2021/0271442 A1 Sep. 2, 2021

Related U.S. Application Data

(63) Continuation of application No. 16/748,179, filed on Jan. 21, 2020, now Pat. No. 11,036,457, which is a (Continued)

(30) Foreign Application Priority Data

Aug. 4, 2015 (KR) ........................ 10-2015-0110079

(51) Int. Cl.
*G06F 3/14* (2006.01)
*G09G 3/3233* (2016.01)
*G09G 3/34* (2006.01)

(52) U.S. Cl.
CPC ......... *G06F 3/1446* (2013.01); *G09G 3/3233* (2013.01); *G09G 3/3426* (2013.01);
(Continued)

(58) Field of Classification Search
CPC ............... G09G 3/3233; G09G 3/3426; G09G 2300/023; G09G 2300/026;
(Continued)

(56) References Cited

U.S. PATENT DOCUMENTS 6,414,661 B1 * 7/2002 Shen ..................... G09G 3/3208
                                                                 345/82
6,583,791 B2    6/2003 Berryman et al.
(Continued)

FOREIGN PATENT DOCUMENTS

JP         5671608 B2      2/2015
KR   10-2003-0041855 A     5/2003
(Continued)

OTHER PUBLICATIONS

Communication dated Sep. 27, 2015 issued by the International Searching Authority in counterpart International Patent Application No. PCT/KR2016/006112. (PCT/ISA/210).
(Continued)

*Primary Examiner* — Amare Mengistu
*Assistant Examiner* — Jennifer L Zubajlo
(74) *Attorney, Agent, or Firm* — Sughrue Mion, PLLC

(57) ABSTRACT

A display device includes a signal receiver configured to receive an image signal; a display including a plurality of modules each including a plurality of light sources, and display an image based on the received image signal; and a controller configured to perform first uniformity calibration between light sources within each individual module with regard to the modules, and second uniformity calibration between the modules, wherein the controller controls the
(Continued)

first uniformity calibration to be applied to the image signal received in the signal receiver based on a first coefficient determined for each of the light sources within each individual module, controls the second uniformity calibration to be applied to the image signal subjected to the first uniformity calibration based on a second coefficient determined for each of the modules, and controls a calibrated image to be displayed based on the image signal subjected to the second uniformity calibration.

18 Claims, 14 Drawing Sheets

Related U.S. Application Data continuation of application No. 15/749,217, filed as application No. PCT/KR2016/006112 on Jun. 9, 2016, now Pat. No. 10,572,208.

(52) U.S. Cl.
CPC . *G09G 2300/023* (2013.01); *G09G 2300/026* (2013.01); *G09G 2320/0233* (2013.01); *G09G 2320/0693* (2013.01); *G09G 2360/145* (2013.01)

(58) Field of Classification Search
CPC ... G09G 2320/0233; G09G 2320/0693; G09G 2360/145
See application file for complete search history.

(56) References Cited

U.S. PATENT DOCUMENTS

| | | | |
|---|---|---|---|
| 10,572,208 B2* | 2/2020 | Park | G09G 3/3233 |
| 2001/0033258 A1 | 10/2001 | Berryman et al. | |
| 2009/0311939 A1 | 12/2009 | Elliott | |
| 2012/0038660 A1 | 2/2012 | Han et al. | |
| 2013/0016081 A1 | 1/2013 | Park et al. | |
| 2013/0033526 A1 | 2/2013 | Hsu et al. | |
| 2013/0321498 A1 | 12/2013 | Otoi et al. | |
| 2020/0320927 A1* | 10/2020 | Baek | G09G 3/3225 |

FOREIGN PATENT DOCUMENTS

| | | |
|---|---|---|
| KR | 10-2012-0015578 A | 2/2012 |
| KR | 10-2013-0007778 A | 1/2013 |

OTHER PUBLICATIONS

Communication dated Oct. 26, 2021 by the Korean Intellectual Property Office in Korean Patent Application No. 10-2015-0110079.

* cited by examiner

DISPLAY DEVICE INCLUDING PLURALITY OF MODULES AND CONTROL METHOD THEREFOR

CROSS REFERENCE TO RELATED APPLICATION(S)

This application is a continuation of U.S. application Ser. No. 16/748,179, filed Jan. 21, 2020, which is a continuation of U.S. application Ser. No. 15/749,217, filed Jan. 31, 2018, which is a National Stage Entry of International Application No. PCT/KR2016/006112, filed Jun. 9, 2016, which claims priority from Korean Application No. 10-2015-0110079, filed Aug. 4, 2015, the disclosures of which are incorporated herein by reference in their entireties.

TECHNICAL FIELD

The present disclosure relates to a display device including a plurality of modules with a plurality of light sources and a method of controlling the same, and more particularly to a display device, in which uniformity calibration between modules is carried out after performing uniformity calibration between light sources to thereby simply, efficiently and accurately calibrate a light output of the display device uniformly, and a method of controlling the same.

BACKGROUND ART

A display device refers to a device with a display panel capable of displaying an image based on an image signal/video data of various formats or a broadcast signal, and is materialized by a TV, a monitor, etc. Such a display panel has various types such as a liquid crystal display panel, a plasma display panel, etc. according to its characteristics and is applied to a variety of display devices.

The display devices are different in brightness and chromaticity of an image displayed thereon due to their electric, physical and optical features. Therefore, an image signal output from one source is displayed with slightly different colors on the different display devices. For example, although the same broadcasting program is given to the display devices through a sky wave or a satellite, the color of the broadcasting program is varied depending on what display devices the broadcasting program will be displayed on.

Further, if light outputs of pixels in a display device having a high resolution are not uniform, problems of image blurring and the like may arise.

To solve these problems, calibration is carried out for making the light output of the display panel uniform. During the calibration, a displayed image is sensed and analyzed by a color sensor to determine a calibration coefficient, the determined calibration coefficient is provided to the display device, and the display device calibrates the light outputs of the pixels based on the calibration coefficient.

In case of a high-resolution display device with a plurality of modules, each module has to be accurately calibrated for a high-resolution display because many modules of the display device are different in characteristics. To this end, the calibration has to be applied to each pixel of a screen. Each individual module has a uniform characteristic, but overall uniformity is deteriorated due to variations between the modules when the modules are connected into one.

Accordingly, there has been proposed a method of connecting all the modules to constitute the display device and then performing the calibration. However, this method has problems in that it is difficult to secure a space since a limitation in the resolution of the color sensor requires a long sensing distance and it takes too long time.

DISCLOSURE

Technical Problem

Accordingly, an aspect of the present disclosure is to provide a display device, in which calibration is simply, efficiently and accurately performed by calibrating uniformity of a light output between light sources in a module of the display device, and then calibrating uniformity of a light output between a plurality of modules, and a method of controlling the same.

Technical Solution

In accordance with an embodiment of the present invention, there is provided a signal receiver configured to receive an image signal; a display configured to comprise a plurality of modules each of which includes a plurality of light sources, and display an image based on the received image signal; and a controller configured to perform first uniformity calibration between the plurality of light sources within each individual module with regard to the plurality of modules, and second uniformity calibration between the plurality of modules, wherein the controller controls the first uniformity calibration to be applied to the image signal received in the signal receiver based on a first coefficient determined for each of the plurality of light sources within each individual module, controls the second uniformity calibration to be applied to the image signal subjected to the first uniformity calibration based on a second coefficient determined for each of the plurality of modules, and controls a calibrated image to be displayed based on the image signal subjected to the second uniformity calibration. Thereby taking a scanning method of the display device into account and performing the calibration between the modules.

The controller determines a module, which will be subjected to the second uniformity calibration, among the plurality of modules based on information about a pixel position of the image. Thereby modifying the coefficients to be applied to the calibration based on a displayed image and more accurately performing the uniformity calibration of the display.

The first coefficient and the second coefficient correspond to at least one of brightness and color of an image displayed on the display. Thereby introducing the external device for providing the coefficients required in the calibration.

The controller receives at least one of the first coefficient and the second coefficient from an external device. Thereby more accurately performing the calibration as the external device senses the image displayed on the display and determines and inputs the first and second coefficients for the uniformity calibration.

At least one of the first coefficient and the second coefficient is determined based on a light output sensed from an image displayed on the display. Thereby more accurately calibrating the light outputs to be uniform between the light sources.

The first coefficient is determined by a light output sensed from a module, to which a light source for determining the first coefficient belongs, among the plurality of modules. Thereby more simply calibrating the light outputs to be uniform between the modules.

The second coefficient is determined by a light output sensed from a representative area of each module. Thereby more accurately calibrating an image to be uniformly displayed on the display.

The controller repeats at least one of the first uniformity calibration and the second uniformity calibration two or more times.

In accordance with an embodiment of the present invention, there is provided a method of controlling a display device comprising a display comprising a plurality of modules each of which includes a plurality of light sources, the method comprising: determining a first coefficient for each of the plurality of light sources, and a second coefficient for each of the plurality of modules; applying first uniformity calibration based on the first coefficient to an image signal received from an outside; applying second uniformity calibration based on the second coefficient to the image signal subjected to the first uniformity calibration; and displaying an image based on the image signal subjected to the first uniformity calibration and the second uniformity calibration on the display. Thereby taking a scanning method of the display device into account and performing the calibration between the modules.

The applying of the second uniformity calibration comprises determining a module, which will be subjected to the second uniformity calibration, among the plurality of modules based on information about a pixel position of the image. Thereby more accurately performing the calibration.

The first coefficient and the second coefficient correspond to at least one of brightness and color of an image displayed on the display. Thereby providing the coefficients required in the calibration.

The determining of the first coefficient and the second coefficient comprises receiving at least one of the first coefficient and the second coefficient from an external device. Thereby more accurately performing the uniformity calibration to the light output of the display.

The determining of the first coefficient and the second coefficient comprises determining at least one of the first coefficient and the second coefficient based on a light output sensed from an image displayed on the display. Thereby more accurately calibrating the light outputs to be uniform between the light sources.

The determining of the first coefficient comprises determining the first coefficient by a light output sensed from a module, to which a light source for determining the first coefficient belongs, among the plurality of modules. Thereby more simply calibrating the light outputs to be uniform between the modules.

The determining of the second coefficient comprises determining the second coefficient by a light output sensed from a representative area of each module. Thereby more accurately calibrating an image to be uniformly displayed on the display.

At least one of the first uniformity calibration and the second uniformity calibration is repeated two or more times.

Advantageous Effects

As described above, according to the present disclosure, uniformity of a light output between light sources of a module is calibrated and then uniformity of a light output between a plurality of modules is calibrated based on the calibration between the light sources, thereby efficiently and accurately calibrating the output of the display device.

BEST MODE

Figure 1:
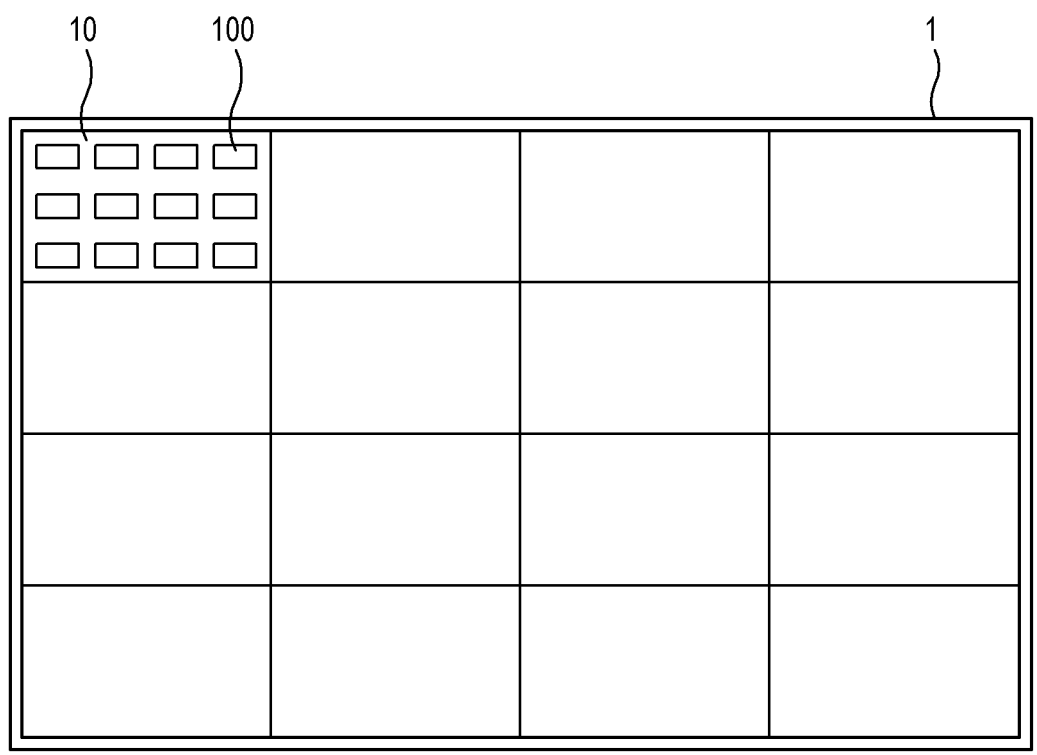
FIG. 1 shows a display device with a plurality of modules according to one exemplary embodiment of the present disclosure.

FIG. 1 shows a display device with a plurality of modules according to one exemplary embodiment of the present disclosure. A display device 1 receives an image signal from the outside, and displays an image based on the image signal to a user. The display device 1 controls a light output of a light source 100 based on the image signal to thereby display an image with a plurality of pixels. To display an image like this, the display device 1 may include a plurality of modules 10 that includes the plurality of light sources 100. The plurality of light sources 100 are provided corresponding to the plurality of pixels. For example, the plurality of light sources 100 may be of the same number as the plurality of pixels so as to respectively correspond to the plurality of pixels, or may be fewer than the plurality of pixels so that two or more pixels can be assigned to one light source 100.

FIG. 1 shows sixteen modules 10 each of which includes twelve light sources 100, but the present disclosure is not limited to these numbers of light sources 100 and module 10 shown therein.

The display device 1 may include the plurality of modules 10, and each module 10 may include the plurality of light sources 100. The module 10 may include the plurality of light sources 100 and a driving circuit for driving each of the light sources 100. The driving circuit may serve to supply an image signal to be received in the plurality of light sources 100, and may include a memory configured to store a coefficient according to embodiments. In this exemplary embodiment, it will be assumed that the driving circuit of the module 10 is included in a controller of the display device 1, and the memory assigned to each of the light sources 100 and each of the modules 10 is included in a storage of the display device 1. Thus, separate descriptions of the driving circuit will be omitted.

The light source 100 refers to an element that emits light based on an image signal received from the display device 1. If the display panel is of a light receiving panel structure, the light source 100 serves as backlight for emitting light and illuminating the panel. On the other hand, if the display panel is of a self-emissive structure, the plurality of light sources 100 constitutes the display panel. The light source 100 may include a light emitting diode, LED) for emitting light to the panel, or a self-emissive organic light emitting diode (OLED). One pixel of an image may be displayed by at least one light source 100, or one light source 100 may be configured to display a plurality of pixels. For convenience of description, in this exemplary embodiment, it will be assumed below that the display panel has the self-emissive panel structure and the light source 100 corresponds to one pixel.

Figure 2:
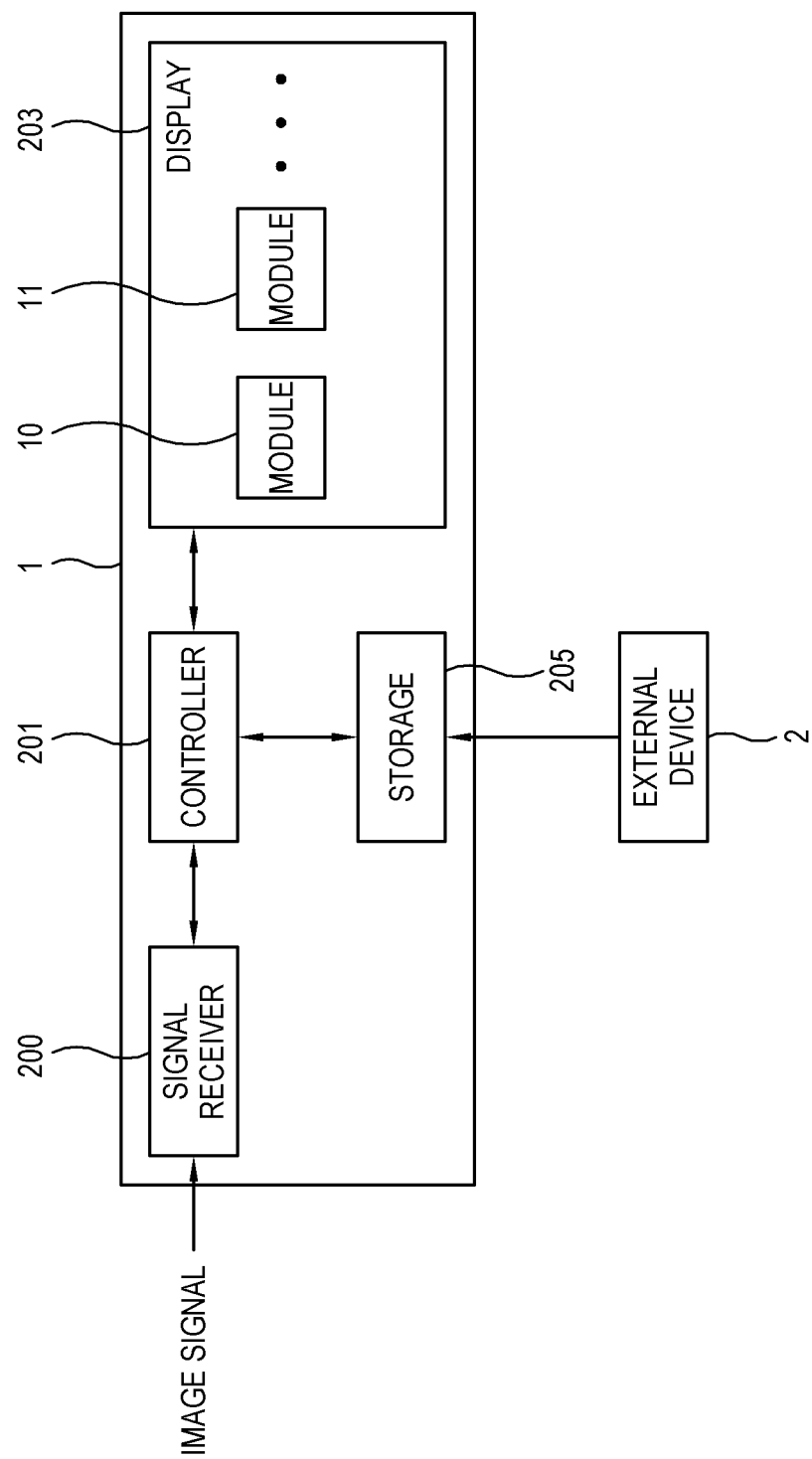
FIG. 2 is a block diagram of a display device according to one exemplary embodiment of the present disclosure.

FIG. 2 is a block diagram of a display device according to one exemplary embodiment of the present disclosure. The display device 1 according to one exemplary embodiment of the present disclosure may include a signal receiver 200, a controller 201, a display 203 and a storage 205.

The display device 1 may be materialized by a large format display (LFD) or the like, and configured to receive an image signal and display an image on the display 203 based on the received image signal and a stored calibration coefficient. However, the display device 1 is not limited to the LFD, and may be materialized by various display devices, for example, a TV, a monitor, a portable media player (PMP), a mobile phone, and the like that can display an image based on an image signal/video data received from the outside or provided therein.

The signal receiver 200 receives and transmits the image signal/image data. The signal receiver 200 may be variously provided corresponding to the formats of the received image signal and the types of the display device 1. For example, the signal receiver 200 may receive a radio frequency (RF) signal from a broadcasting station wirelessly, or may receive an image signal corresponding to the standards of composite video, component video, super video, Syndicat des Constructeurs d'Appareils Radiorécepteurs et Téléviseurs (SCART), high definition multimedia interface (HDMI), a Display Port, a unified display interface (UDI), or wireless HD by a wire. If the image signal is a broadcast signal, the signal receiver 200 may further include a tuner to be tuned to a channel corresponding to the broadcast signal, and may receive an image data packet from a server through a network.

The display 203 displays an image based on an image signal in response to control of the controller 201. Further, the display 203 may include a non-emissive display panel and a backlight unit for illuminating the display panel, or may include a self-emissive display panel. In this exemplary embodiment, the display panel includes the plurality of modules 10, and each module 10 has a self-emissive panel structure where the plurality of light sources 100 is configured to form the pixels of the display panel. However, the scope of the present disclosure is not limited to this exemplary embodiment. The plurality of light sources 100 in the display 203 are configured to output light corresponding to at least one pixel in order to display an image based on a received image signal. However, the plurality of light sources 100 may output light having different levels due to their own individual characteristics even though the image signals having the same level are input to the light sources 100, thereby causing undesired problems troubles such as image blurring or smoothing.

To solve these problems, the storage 205 according to one exemplary embodiment is configured to store a first coefficient determined corresponding to each individual light source 100 to calibrate an image signal, and the first coefficient stored corresponding to each light source 100 is used in performing first uniformity calibration between the plurality of light sources 100 within each individual module 10. Further, the storage 205 may be configured to store a second coefficient for calibrating the image signal, which is subjected to the first uniformity calibration based on the first coefficient, once more with respect to each module 10, and the second coefficient stored corresponding to each module 10 is used in performing second uniformity calibration between the plurality of modules 10 after the first uniformity calibration.

That is, the first uniformity calibration is performed by applying the first coefficient of each light source 100 corresponding to the received image signal so that light can be uniformly emitted among the light sources 100 of each individual module 10, and the second uniformity calibration is performed by applying the second coefficient of the module 10, which will be subjected to the second uniformity calibration, to the image signal subjected to the first coefficient after the first uniformity calibration so that light can be uniformly emitted among the modules 10. Hereinafter, according to this exemplary embodiment, the uniformity of the light output refers to uniformity in the brightness, the chromaticity, or both the brightness and the chromaticity of sensed light output from each light source 100 or module 10, and the uniformity calibration refers to application of the first coefficient or the second coefficient to the received image signal so that the light emitted from each light source 100 or module 10 can have the same brightness, the same chromaticity or the same brightness and chromaticity based on the image signal of the same level.

The storage 205 may be materialized by a non-volatile memory (e.g. a writable read only memory (ROM)) in which data remains even if the display device 1 is powered off, and changed matters can be reflected. In other words, the storage 205 may be materialized by one of a flash memory, an erasable and programmable read only memory (EPROM), an electrically programmable read only memory (EEPROM). In this exemplary embodiment, the first coefficient and the second coefficient are stored in one storage 205 for convenience of description, but not limited thereto. Alternatively, each light source 100 or module 10 of the display device 1 may include a memory configured to store the coefficients therein.

The storage 205 may be configured to store the first coefficients respectively corresponding to the light sources 100 in memories assigned to the plurality of light sources 100, and store the second coefficients respectively corresponding to the modules 10 in memories assigned to the plurality of modules 10.

Alternatively, the storage 205 may be configured to store the first coefficients respectively corresponding to the light sources 100 and the second coefficients respectively corresponding to the modules 10 in the memories assigned to the plurality of light sources 100.

The display device 1 may receive the first coefficient and the second coefficient through a connected external device 2. The external device 2 may include a color sensor configured to sense an image displayed on the display 203, and a computing device configured to determine a first coefficient for each light source 100 and a second coefficient for each module 10 so that the light output can be uniform based on a sensed value, and input the determined first and second coefficients to the display device 1. The external device 2 calculates and determines the first coefficient with regard to each light source 100 so as to calibrate the light output to be uniform among the plurality of light sources 100 within each individual module 10 based on at least one of the brightness and the color of an image displayed on the display 203, and calculates and determines the second coefficient with regard to each module 10 so as to calibrate the light output to be uniform among the plurality of modules 10. Then, the external device 2 inputs the first and second coefficients to the display device 1, and the display device 1 stores the first and second coefficients output from the external device 2 in the storage 205.

According to another exemplary embodiment, the external device 2 may include only the color sensor, and the external device 2 may serve only to sense the image displayed on the display 203 and send a sensed value corresponding to the brightness or color of each light source 100 and each module 10 or a representative value obtained by averaging the sensed values to the display device 1. The controller 201 of the display device 1 determines the first coefficient with regard to each of the plurality of light sources 100 based on the received sensed value, and determines the second coefficients with regard to each of the plurality of modules 10, and controls the storage 205 to store the first and second coefficients.

The controller 201 controls general operations of the display device 1. For example, the controller 201 may apply the first and second coefficients stored in the storage 205 to apply the first uniformity calibration and the second uniformity calibration to an image signal received through the signal receiver 200, and processes the image signal, which has been subjected to the first uniformity calibration and the second uniformity calibration, so that the display 203 can display the calibrated image.

In more detail, the controller 201 performs the first uniformity calibration by applying the first coefficient of each light source 100 to an image signal so that the light output can be uniform among the plurality of light sources 100 within each individual module 10 with regard to the plurality of modules 10. Then, the controller 201 performs the second uniformity calibration by applying the second coefficient of the module 10, which will be subjected to the second uniformity calibration, to the image signal, which has been subjected to the first uniformity calibration, so that the light output can be uniform amongst the plurality of modules 10. That is, the first uniformity calibration is performed so that the light output can be uniform among the plurality of light sources 100 within each individual module 10, and then the second uniformity calibration is performed so that the light output can be uniform among the plurality of modules 10 of the display 203.

Further, if the storage 205 is configured to store the second coefficient corresponding to each module in the memory assigned to each module 10, the controller 201 determines what module 10 will be subjected to the second uniformity calibration corresponding to a position of a pixel based on information of the position of the pixel in an image from a received signal, and applies a corresponding second coefficient to the determined module 10.

Alternatively, if the storage 205 is configured to store both the first coefficient corresponding to each light source 100 and the second coefficient of the corresponding module 10 in the memory assigned to each of the plurality of light sources 100, the controller 201 may apply the first and second coefficients to a signal input to the light source 100 regardless of information about a position of a pixel in an image, thereby calibrating the light output to be uniform.

Figure 3:
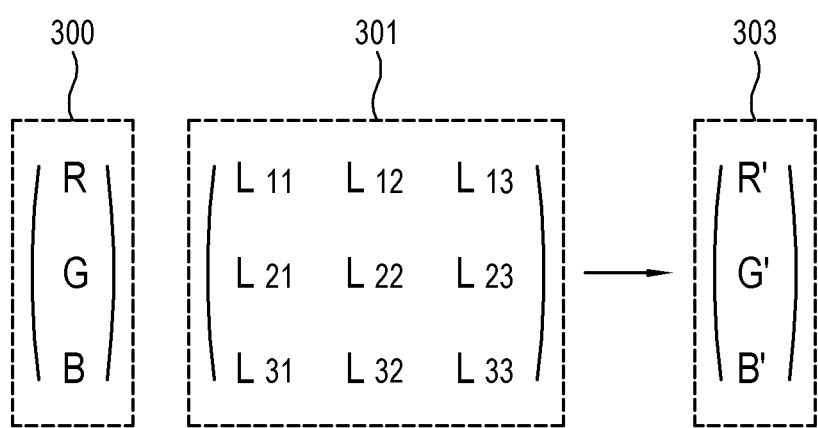
FIG. 3 shows an example of applying a matrix of first coefficients for performing uniformity calibration between light sources in a module according to one exemplary embodiment.
Figure 4:
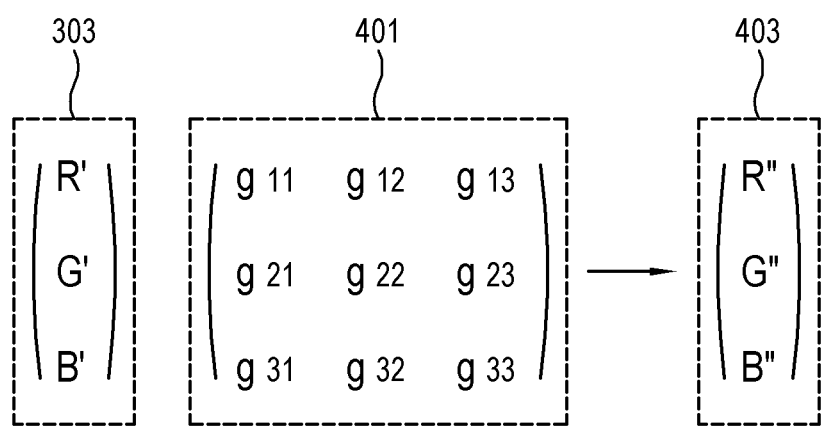
FIG. 4 shows an example of applying a matrix of second coefficients for performing uniformity calibration between a plurality of modules according to one exemplary embodiment of the present disclosure.

FIG. 3 shows a matrix of the first coefficients for performing the uniformity calibration between the light sources within each individual module, and FIG. 4 shows a matrix of the second coefficients for performing the uniformity calibration between the plurality of modules.

Referring to FIG. 3, under control of the controller 201, a red, green and blue (RGB) signal 300 is and converted into a signal 303 subjected to the first uniformity calibration by a first coefficient 301 of the light source 100 corresponding to a pixel.

The first coefficient 301 is determined corresponding to each light source 100 so that the outputs from the plurality of light sources 100 can be uniformly calibrated within each individual module 10. Before performing the calibration, the plurality of light sources 100 within the module 10 may be different in the characteristics of the light output from one another. That is, such different output characteristics of the plurality of light sources 100 may make the light outputs from the light sources 100 be varied even though an image signal having the same level is input. The external device 2 senses the light outputs of the light sources 100 within each module 10 according to the modules 10, and calculates a deviation in the light output between the light sources 100 based on the sensed brightness or color. The external device 2 determines the first coefficient for each light source 100 and inputs the first coefficient to the display device 1 so as to decrease the deviation in the light output between the light sources 100, and the display device 1 stores the input first coefficient 301 for each light source 100 in the storage 205.

Referring to FIG. 4, the module 10 is determined corresponding to a position of a pixel, and the signal 303, which has been subjected to the first uniformity calibration, is output as a signal 403 subjected to the second uniformity calibration by a second coefficient 401 of the determined module 10.

The second coefficient 401 is determined to make the outputs be uniformly calibrated between the modules 10 of the display 203. Although the light outputs are uniformly calibrated between the light sources 100 within the module 10, the overall characteristics of the light outputs may be not uniform due to a deviation between the modules 10. The display device 1 calibrates the uniformity of the light output amongst the plurality of light sources 100 based on the input first coefficient 301 within each individual module 10, and the external device 2 senses the light output of each module 10. The external device 2 calculates a deviation between the modules 10 based on a sensed value of the brightness and color of each module 10 or a representative value obtained by averaging the sensed values, determines a second coefficient to reduce a deviation in the light output between the modules 10, and inputs the second coefficient to the display device 1. Then, the display device 1 stores the input second coefficient 401 of each module 10 in the storage 205.

As an alternative to the exemplary embodiment of determining the second coefficient 401, the external device 2 may sense a representative area but not all the modules 10, calculate a deviation between the modules 10 based on a sensed value of brightness and color or a representative value obtained by averaging the sensed values, determine the second coefficient 401 for reducing the deviation in the output between the modules 10, and provide the determined second coefficient 401 to the display device 1.

Alternatively, the second coefficient 401 for the module 10 is stored corresponding to not each module 10 but each light source 100, and directly applied to the signal 301 subjected to the first uniformity calibration without determining the module 10, which will be subjected to the second uniformity calibration, according to pixel positions, thereby outputting a signal subjected to the second uniformity calibration.

Further, according to another exemplary embodiment, the external device 2 may serve only to sense an image displayed on the display 203 and provide a sensed value corresponding to the sensed brightness and color to the display device 1. Based on the sensed value received from the external device 2, the controller 201 may determine the first coefficient so that the output can be uniformed in between the plurality of light sources 100 within each individual module 10, and may determine the second coefficient so that the output can be uniform in between the plurality of modules 10.

Figure 5:
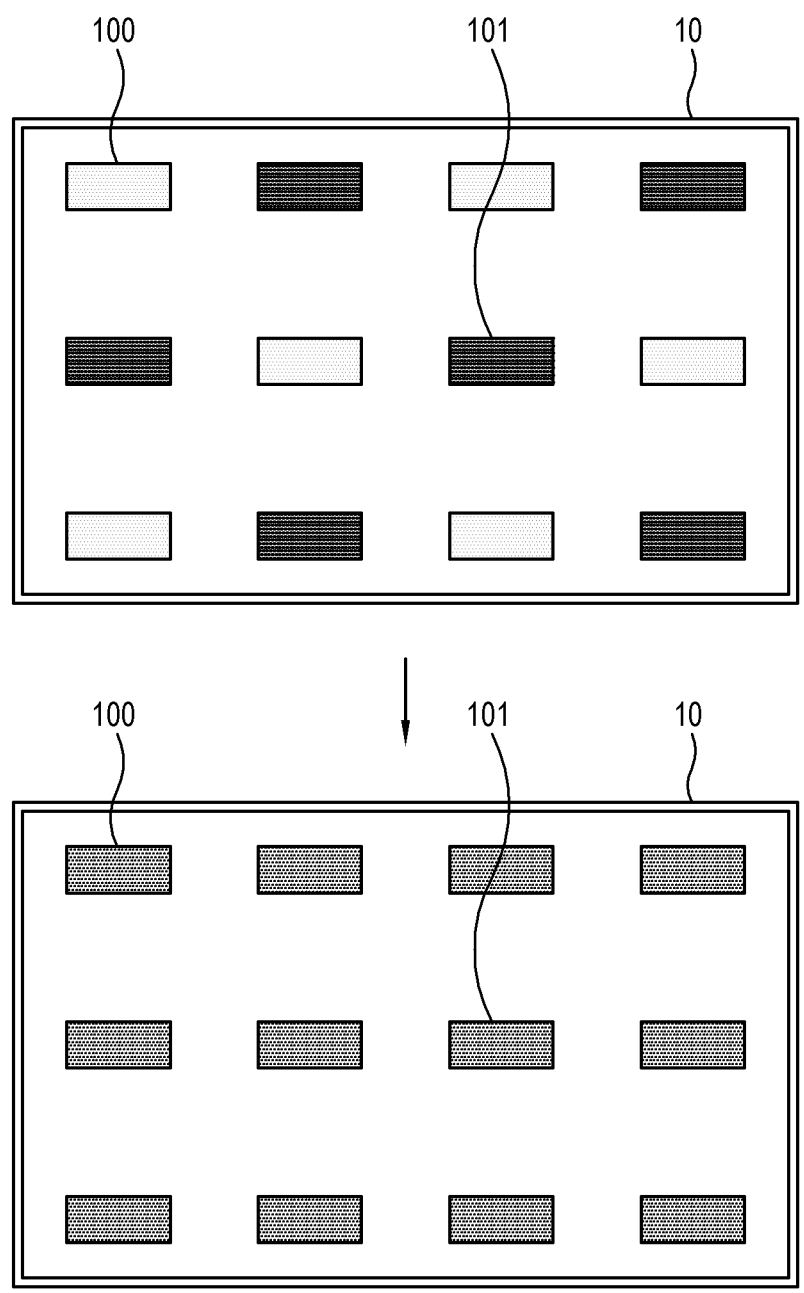
FIG. 5 shows an operation where the uniformity calibration between the light sources in the module is performed according to one exemplary embodiment of the present disclosure.

FIG. 5 shows an operation where the first uniformity calibration between the light sources in the module is performed according to one exemplary embodiment of the present disclosure.

One module 10 may include a plurality of light sources 100, and the light sources 100 may be different in light output characteristics from one another until the calibration is performed. Referring to the upper side of FIG. 5, the light output is not generally uniform since the plurality of light sources 100 within one module 10 are different in output characteristics from one another. The external device 2 senses the light outputs of all the light sources 100 within the module 10, and determines the first coefficient for calibrating the uniformity. The first coefficient may be determined by using one of the light sources 100 as a reference to calibrate the light outputs of the other light sources 100. For example, the first coefficient may be determined for each of the light sources 100 by using the darkest light source 101 as a reference so that the rest of the light sources 100 can output the light having the same level as that of the reference light source 101. Then, the external device 2 inputs the determined first coefficient to the display device 1. The display device 1 applies the first coefficient for each light source 100 received from the external device 2 to the image signal, and calibrates the light output of the light source 100 corresponding to the image signal.

Referring to the lower side of FIG. 5, the calibration is completed, and the plurality of light sources 100 within the module 10 outputs light uniformly.

Figure 6:
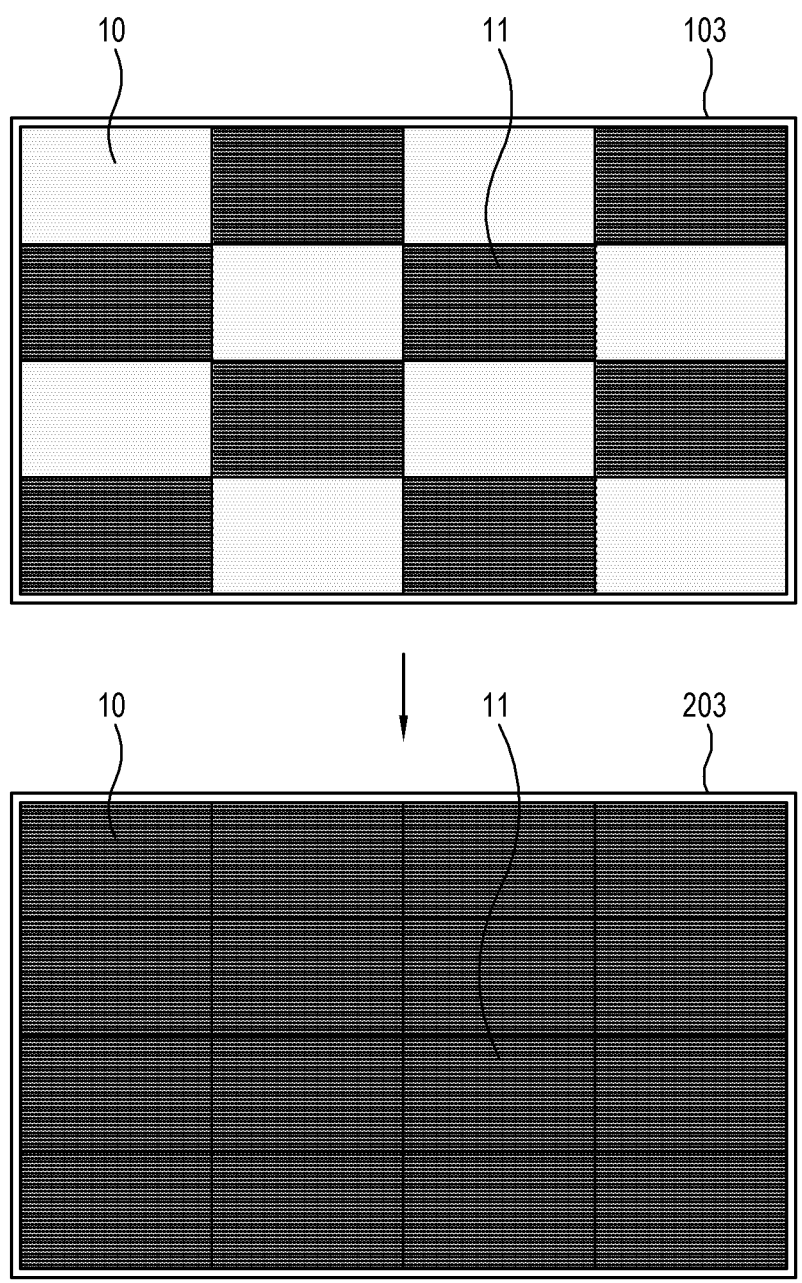
FIG. 6 shows an operation where the uniformity calibration between the plurality of modules is performed according to one exemplary embodiment of the present disclosure.

FIG. 6 shows an operation where the uniformity calibration between the plurality of modules is performed according to one exemplary embodiment of the present disclosure.

Even after the uniformity between the plurality of light sources 100 within each individual module 10 is calibrated, the light output between the plurality of modules 10 may be not uniform due to deviation between the modules 10. Referring to the upper side of FIG. 6, the light output from the plurality of modules 10 is not generally uniform. The external device 2 senses the light output each of the plurality of modules 10 that constitutes the display 203, and determines the second coefficient for calibrating the uniformity. The second coefficient may be determined by using one of the modules as a reference to calibrate the light outputs of the other modules. For example, the second coefficient may be determined for each of the modules 10 by using the darkest module 11 as a reference so that the rest of the modules 10 can output the light having the same level as that of the reference module 11. Then, the external device 2 inputs the determined second coefficient to the display device 1. The display device 1 applies the second coefficient for each module 10 received from the external device 2 to the image signal, and calibrates the light output of the module 10 corresponding to the image signal.

Referring to the lower side of FIG. 6, the calibration is completed, and the plurality of modules 10 outputs light uniformly.

Figure 7:
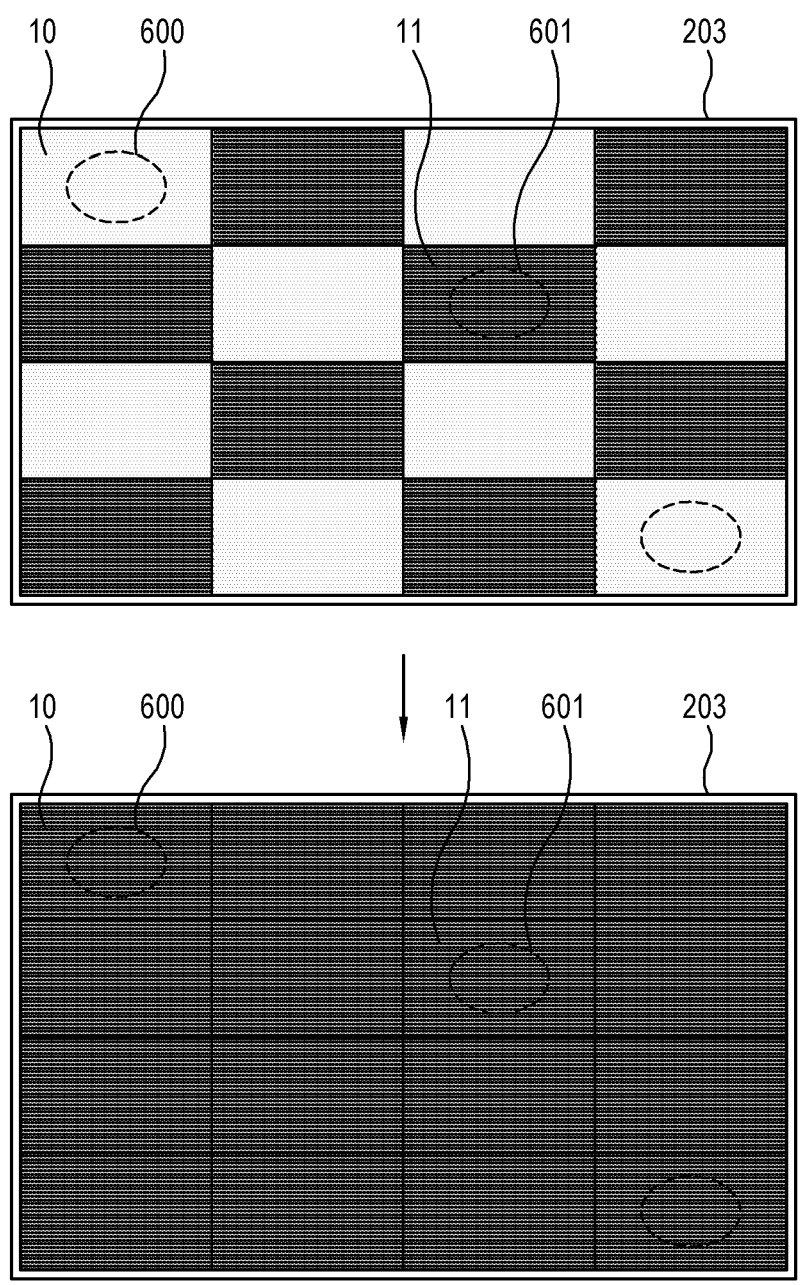
FIG. 7 shows an operation where the uniformity calibration between the plurality of modules is performed by sensing a representative area of the module according to one exemplary embodiment of the present disclosure.

FIG. 7 shows an operation where the second uniformity calibration between the plurality of modules is performed by sensing a representative area of the module according to one exemplary embodiment of the present disclosure.

According to another exemplary embodiment of the present disclosure, the external device 2 may use a representative value of each module 10 and determine the second coefficient for uniformly calibrating the light outputs between the modules 10. As described above, the representative value of the module may be obtained by averaging the sensed values of all the pixels of each module. However, if the values of all the pixels in the module are sensed at one time, the light output may be not accurately sensed according to the sizes of a lens because the amount of light sensed at the corner of the module is decreased by a vignetting effect due to a focal distance difference. Further, a lens is required to have a higher resolution to more accurately sense the whole module. To determine the second coefficient by accurately sensing the module without the high-resolution lens, according to this embodiment a representative area 600 may be selected and sensed in the whole area of each module 10 and a representative value may be obtained by averaging the sensed pixel values of the representative areas 600. The representative area 600 may be a center portion of each module, or may be a randomly selected specific area. Further, the representative areas 600 of the modules may be determined as positions corresponding to each other between the modules 10 in order to improve accuracy.

Therefore, the external device 2 senses the representative area 600 of each module 10, determines the second coefficient based on the representative sensed value, and inputs the determined second coefficient to the display device. In determining the second coefficient, the second coefficient may be determined for each of the modules 10 so that the levels of the light outputs sensed in other representative areas 600 can be equal to the level of the light output sensed in the representative area 601 used as a reference. The display device 1 applies the second coefficient of each module 10 to the image signal and calibrates the light output of each module 10.

Referring to the upper side of FIG. 7, the light outputs of the representative areas 600 of the modules 10 are different in level and not uniform until the calibration is performed.

On the other hand, referring to the lower side of FIG. 7, the light outputs of the modules 10 are generally uniform after the calibration is performed. With this, it will be understood that the sensing of the representative area 600 but not all the areas does not affect the calibration results. Therefore, it is enough to sense only a part of the module 10, a sensing resolution required for the external device 2 is lower than that for sensing all the modules 10, it is possible to perform the sensing at a short distance, and it is possible to accurately sense the light output of the module 10 even though the vignetting effect is caused by the lens of the external device 2 for sensing the light output, thereby performing simple and efficient calibration.

Figure 8:
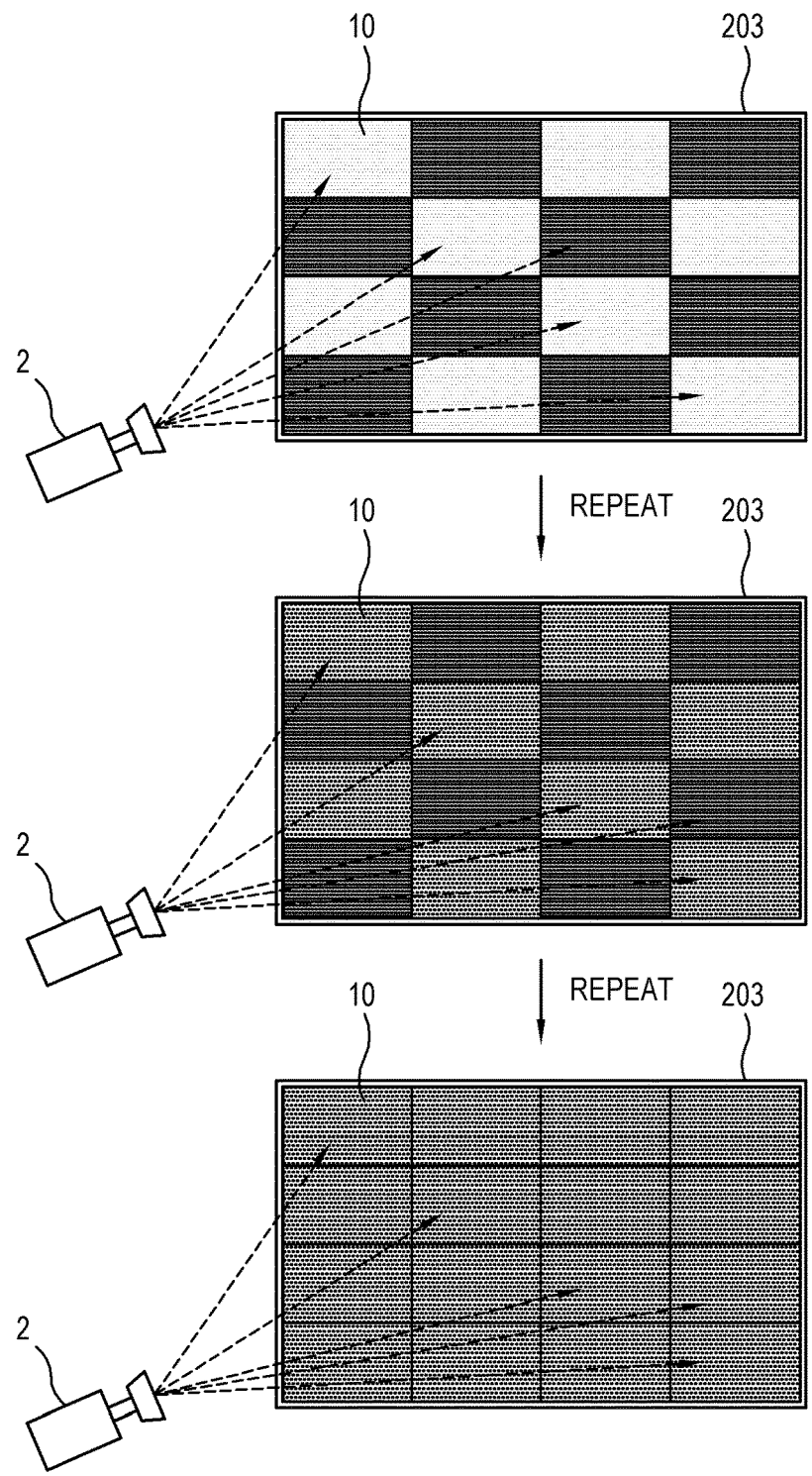
FIG. 8 shows an operation where the uniformity calibration between the plurality of modules is repetitively performed according to one exemplary embodiment of the present disclosure.

FIG. 8 shows an operation where the uniformity calibration between the plurality of modules is repetitively performed according to one exemplary embodiment of the present disclosure. Although the uniformity calibration is performed between the modules 10, just single sensing and calibration may be insufficient to fully calibrate the light outputs to be uniform between the modules 10. Therefore, the external device 2 senses the calibrated light output of each module 10 again, and inputs the second coefficient modified based on the sensed value to the display device 1. The display device 1 applies the modified second coefficient to the image signal, and calibrates the light output of each module 10. The sensing and the calibration may be repeated until the light outputs between the modules 10 are accurately uniform.

In this exemplary embodiment, the uniformity calibration between the plurality of modules 10 is repetitively performed. In addition, the uniformity calibration between the light sources 100 may be also repetitively performed.

Figure 9:
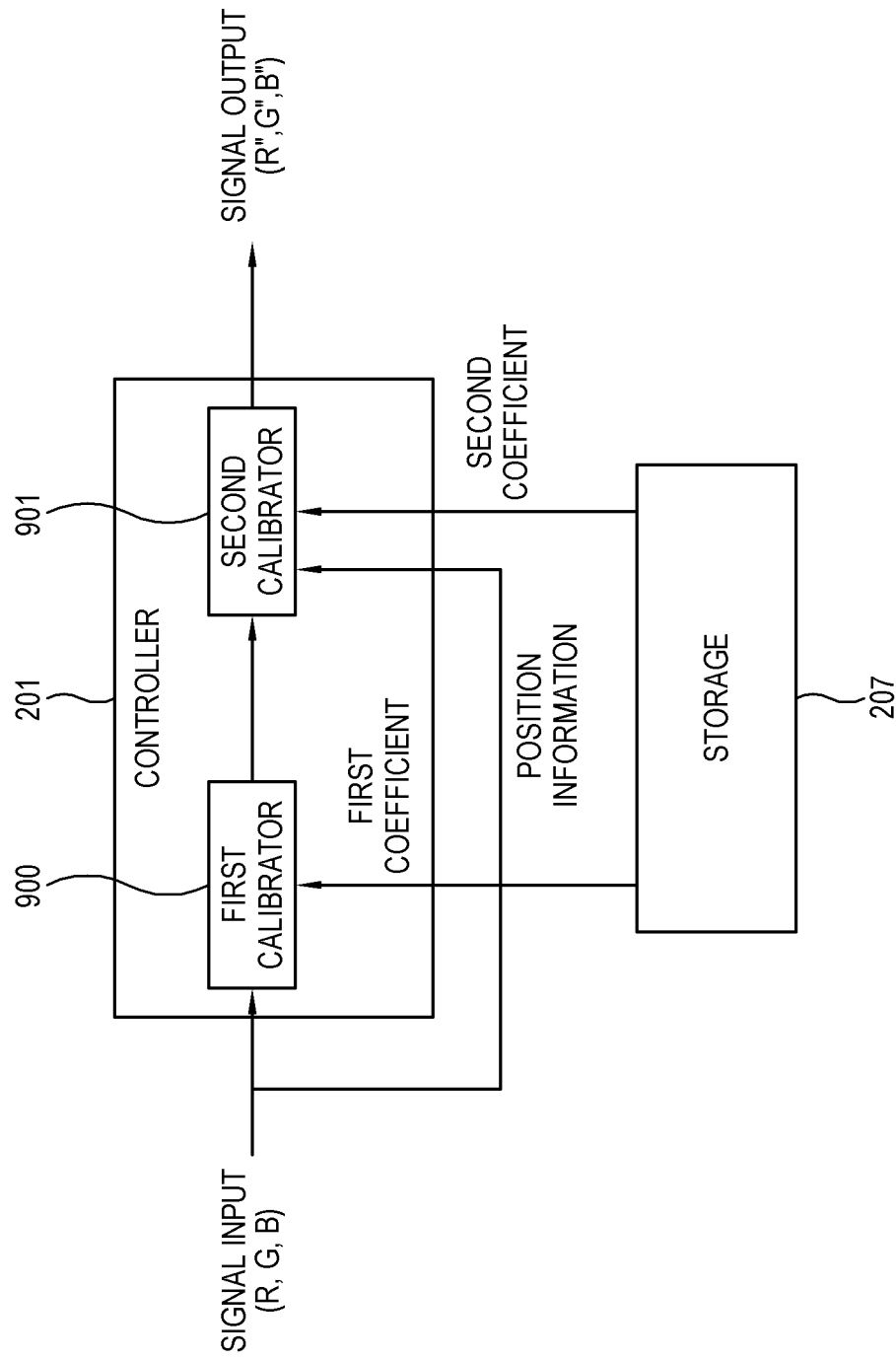
FIG. 9 is a block diagram of a controller for performing the uniformity calibration according to one exemplary embodiment of the present disclosure.

FIG. 9 is a block diagram of a controller 201 for performing the calibration according to one exemplary embodiment of the present disclosure.

According to this exemplary embodiment, the controller 201 performs the first uniformity calibration by applying the first coefficient of each light source 100 to an input image signal, and then performs the second uniformity calibration by applying the second coefficient of the corresponding module 10. The controller 201 may include a first calibrator 900 for performing the first uniformity calibration, and a second calibrator 901 for performing the second uniformity calibration.

The first calibrator 900 may be configured to apply the first coefficient of each light source 100, provided from the storage 205, to the input image signal. By applying the first coefficient to the received image signal, the light outputs between the light sources 100 within the module 10 are uniformly calibrated.

Then, the second calibrator 901 may be configured to apply the second coefficient of the corresponding module 10, provided from the storage 205, to the image signal subjected to the first uniformity calibration. In this case, the corresponding module 10 is determined based on pixel position information embedded in the image signal, and the determined second coefficient of the module 10 is received from the storage 205 and applied. By applying the second coefficient to the image signal subjected to the first uniformity calibration, the light outputs between the modules 10 are uniformly calibrated.

If the light outputs between the light sources 100 or the light outputs between the modules 10 are not uniform even through the first uniformity calibration or the second uniformity calibration is performed, the sensing and the calibration may be repetitively performed as described above to thereby have an accurate calibration effect.

According to another exemplary embodiment, if the second coefficient together with the first coefficient is stored in the memory assigned to each light source 100, the first uniformity calibration and the second uniformity calibration may be performed by applying the second coefficient of each light source 100 to the signal subjected to the first coefficient of each light source without determining the corresponding module 10 based on the pixel position information embedded in the image signal.

Figure 10:
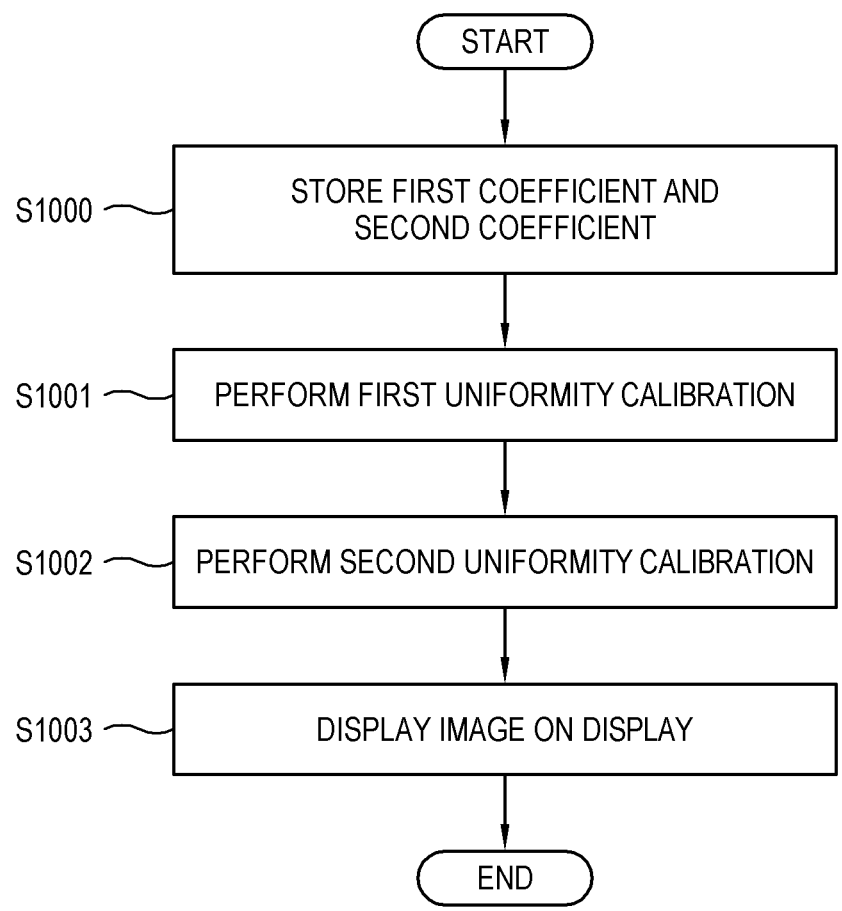
FIG. 10 is a flowchart of controlling the display device according to one exemplary embodiment of the present disclosure.

FIG. 10 is a flowchart of controlling the display device according to one exemplary embodiment of the present disclosure.

First, at operation S1000, the first coefficient and the second coefficient are stored in the storage 205. The external device 2 may determine and provide the first coefficient and the second coefficient based on an image displayed on the display 203 to the display device 1.

At operation S1001, the controller 201 performs the first uniformity calibration based on the first coefficient. The controller 201 applies the first coefficient of each light source 100 to the input image signal, and thus generates a signal subjected to the first uniformity calibration. By applying the first coefficient, the light outputs of the light sources 100 are made uniform. At operation S1002, the controller 201 performs the second uniformity calibration based on the second coefficient. The controller 201 applies the second coefficient of the corresponding module 10 to the signal subjected to the first uniformity calibration, and generates and outputs a signal subjected to the second uniformity calibration. By applying the second coefficient, the light outputs between the modules 10 are made uniform. Last, at operation S1003, under control of the controller 201, an image subjected to both the first uniformity calibration and the second uniformity calibration is displayed on the display 203.

In the operations of determining the first coefficient and the second coefficient, the external device determines the first coefficient so that the display device 1 can perform the first uniformity calibration based on the first coefficient, and then the external device 2 determines the second coefficient so that the display device 1 can perform the second uniformity calibration based on the second coefficient, in which the operations of determining the coefficients and the operation of sensing the image displayed on the display device 1 are repetitively performed to ultimately determine the first coefficient and the second coefficient and store them in the display device 1.

That is, in this exemplary embodiment, the first coefficient and the second coefficient are determined by repetitively performing the sensing and the calibration and then stored in the display device 1, and the display device 1 applies the determined first and second coefficients to a received image signal and displays an image subjected to calibration.

According to another exemplary embodiment, the external device 2 may be configured to only serve to sense an image displayed on the display 203 and provide the sensed value to the display device 1. The controller 201 determines the first coefficient to make the outputs be uniform between the light sources 100 based on the value sensed by and output from the external device 2, and determines and modifies the second coefficient to make the outputs be uniform between the modules 10.

Figure 11:
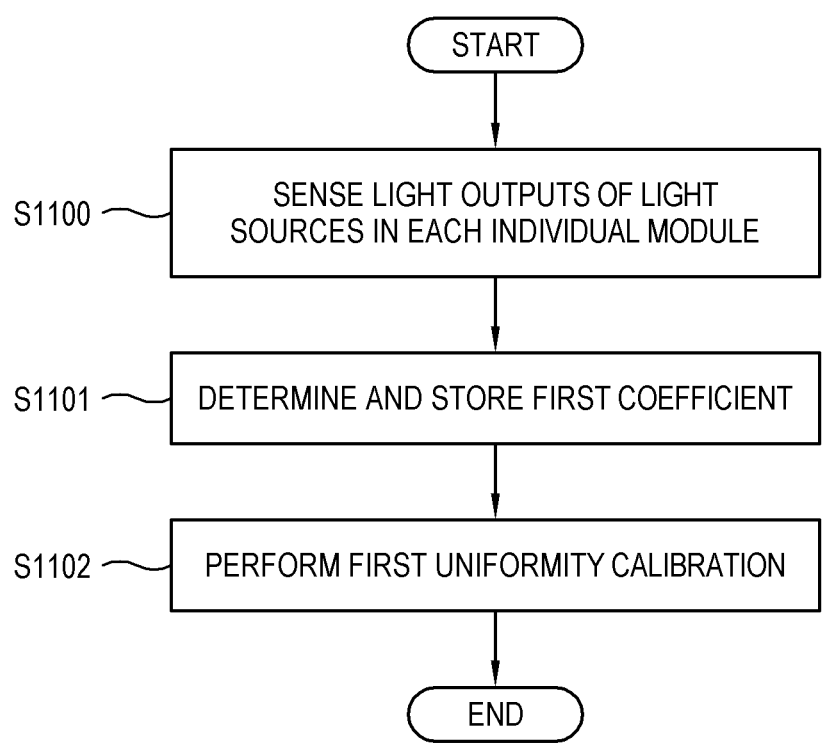
FIG. 11 is a flowchart of performing the uniformity calibration by sensing light outputs between the light sources in the module according to one exemplary embodiment of the present disclosure.

FIG. 11 is a flowchart of performing the uniformity calibration by sensing light outputs between the light sources in the module according to one exemplary embodiment of the present disclosure.

First, at operation S1100 the external device 2 senses the light outputs of the light sources 100 within each individual module 10. Then, at operation S1101, the external device 2 determines the first coefficient for uniformly calibrating the light outputs between the light sources 100 and inputs the determined first coefficient to the display device 1, and the display device 1 stores the input first coefficient in the storage 205. Last, at operation S1102, the display device 1 performs the first uniformity calibration based on the first coefficient to thereby make the light outputs be uniform between the light sources 100.

In this exemplary embodiment, the first coefficient is determined and applied to make the light outputs be uniform in between the light sources 100 within the module 10. However, if the light outputs between the light sources 100 are not uniform even though the determined first coefficient is applied, the operations shown in FIG. 11 may be repetitively performed by returning to the operation S1100.

According to another exemplary embodiment, the external device 2 may be configured to only serve to sense an image displayed on the display 203 and provide the sensed value to the display device 1. The controller 201 may determine and modify the first coefficient based on the value sensed by and output from the external device 2 so that the outputs can be uniform between the light sources 100.

Figure 12:
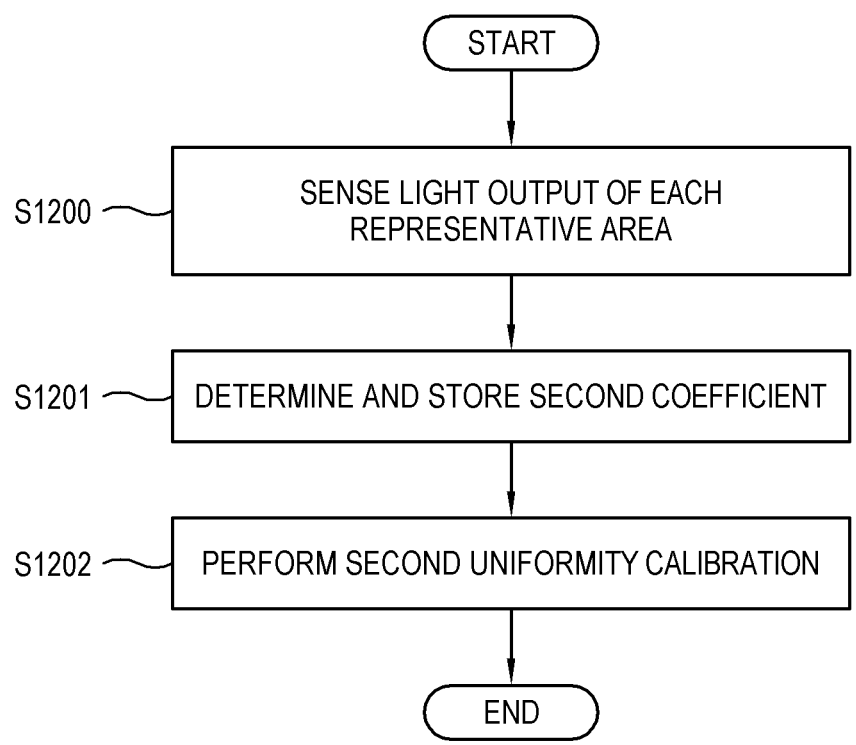
FIG. 12 is a flowchart of performing the uniformity calibration by sensing light outputs between the modules according to one exemplary embodiment of the present disclosure.

FIG. 12 is a flowchart of performing the uniformity calibration by sensing light outputs between the modules according to one exemplary embodiment of the present disclosure.

First, at operation S1200, the external device 2 senses the light output of the representative area in each individual module 10. Then, at operation S1201, the external device 2 determines the second coefficient to make the light outputs of the modules 10 be uniform based on a representative value sensed from the representative area and inputs the determined second coefficient to the display device 1, and the display device 1 stores the received second coefficient in the storage 205. Last, at operation S1203, the display device 1 performs the second uniformity calibration for calibrating the light outputs to be uniform between the modules 10 based on the second coefficient.

In this exemplary embodiment, the second coefficient is determined and applied to make the light outputs be uniform in between the modules 10. However, if the light outputs between the modules 10 are not uniform even though the determined second coefficient is applied, the operations shown in FIG. 12 may be repetitively performed by returning to the operation S1200.

According to another exemplary embodiment, the external device 2 may be configured to sense a representative area of the module 10, and determine the second coefficient for calibrating the uniformity of the light output between the modules 10 based on a sensed representative value.

According to still another exemplary embodiment, the external device 2 may be configured to only serve to sense an image displayed on the display 203 and provide the sensed value to the display device 1. The controller 201 may determine and modify the second coefficient based on the value sensed by and output from the external device 2 so that the outputs can be uniform between the modules 10.

Figure 13:
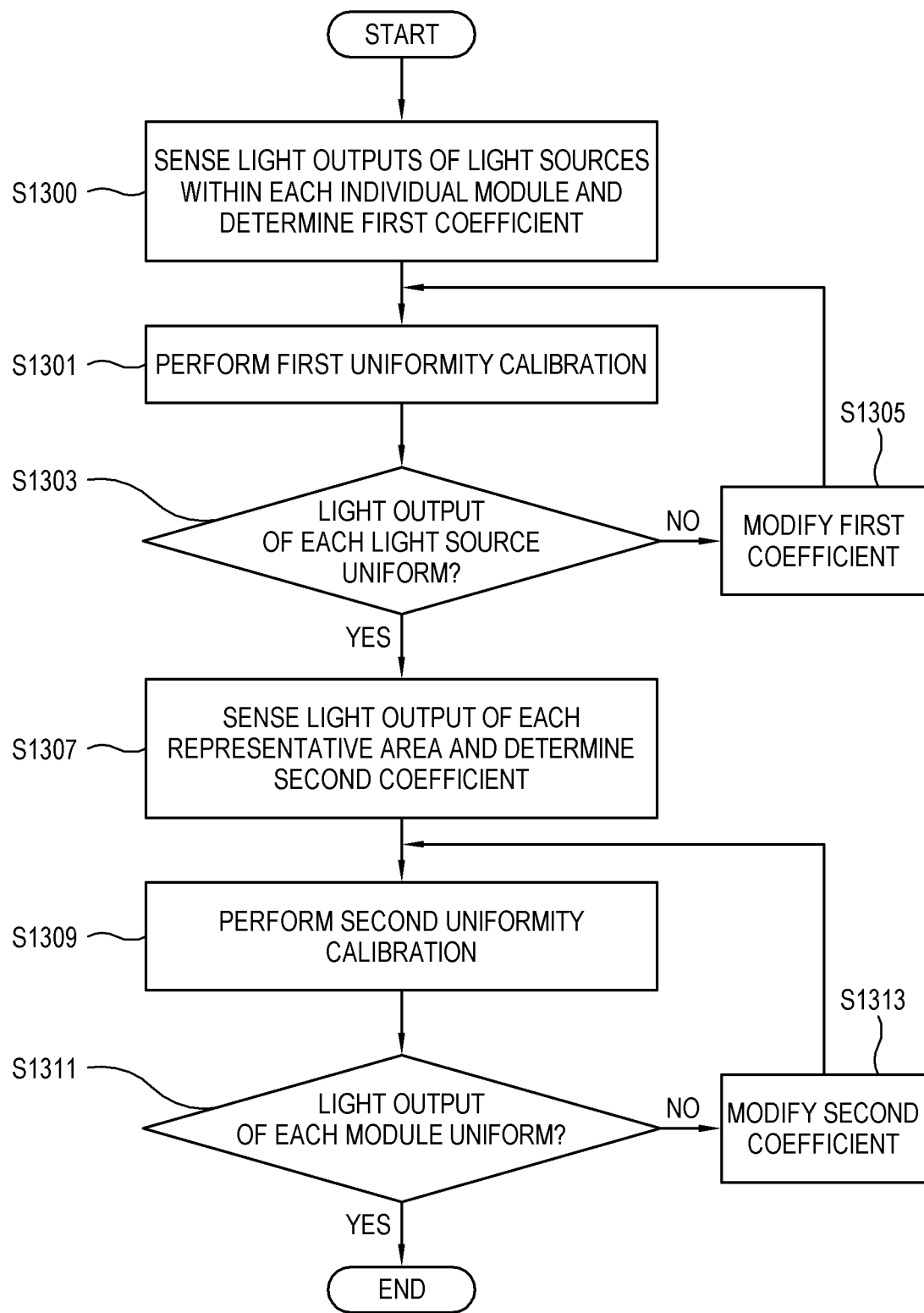
FIG. 13 is an overall flowchart of performing the uniformity calibration in the display device according to one exemplary embodiment of the present disclosure.

FIG. 13 is an overall flowchart of performing the uniformity calibration in the display device according to one exemplary embodiment of the present disclosure.

First, at operation S1300, the external device 2 measures the light outputs of the light sources 100 within each individual module 10, determines the first coefficient, and inputs the determined first coefficient to the display device 1. Then, at operation S1301, the controller 201 performs the first uniformity calibration based on the first coefficient so that the light outputs can be uniform in between the light sources 100 within each individual module 10. Then, at operation S1303, the external device 2 senses whether the light outputs are uniform between the light sources 100 within each individual module 10. If it is determined that the light outputs are not uniform between the light sources 100, at operation S1305 the external device 2 determines the first coefficient again and inputs the determined first coefficient to the display device 1, and the display device 1 modifies the first coefficient and performs the first uniformity calibration again based on the modified first coefficient. On the other hand, if it is determined that the light outputs are not uniform between the light sources 100, at operation S1307 the external device 2 determines the second coefficient by sensing the light output of the representative area within each individual module 10, and inputs the determined second coefficient to the display device 1. Then, at operation S1309, the controller 201 performs the second uniformity calibration based on the second coefficient so that the light outputs can be uniform in between the modules 10. Then, at operation S1311, the external device 2 senses whether the light outputs are uniform between the modules 10. If it is determined that the light outputs are not uniform between the modules 10, at operation S1313 the external device 2 determines the second coefficient again and inputs the determined second coefficient to the display device, and the display device 1 modifies the second coefficient and performs the second uniformity calibration again based on the modified second coefficient. On the other hand, if it is determined that the light outputs are uniform between the modules 10, the operations are terminated.

Then, the display device 1 applies the stored first and second coefficients to the received image signal, thereby displaying a uniformly calibrated image.

In this exemplary embodiment, the control method of the display device 1, which includes the operations of determining, storing and repeating the coefficients, is described. After determining the first coefficient and the second coefficient for the uniform output of the display device 1 through the operations shown in FIG. 13, the operation of sensing the image of the display device 1 again is omitted, and the calibrated image is displayed by applying the first coefficient and the second coefficient to the image signal.

According to another exemplary embodiment, if a new module 10 is added, the light output of the added module 10 is sensed, the first coefficient is determined and stored to make the outputs be uniform between the light sources 100 without newly determining and applying again the first coefficients and the second coefficients for all the modules 10, and the second coefficient is newly determined and stored so that the light outputs can be uniform between the other modules 10.

According to still another exemplary embodiment, there are no needs of calibrating the outputs amongst all the light sources 100 even though a new light source 100 is added, the first coefficient is newly determined and modified within the module 10 where the new light source 100 is added, and the second coefficient is newly determined and modified by sensing the outputs between the modules 10 as necessary.

That is, there are no needs of calibrating the light outputs between all the light sources 100 even though the module 10 or the light source 100 is newly added, and it is thus possible to efficiently save time.

Figure 14:
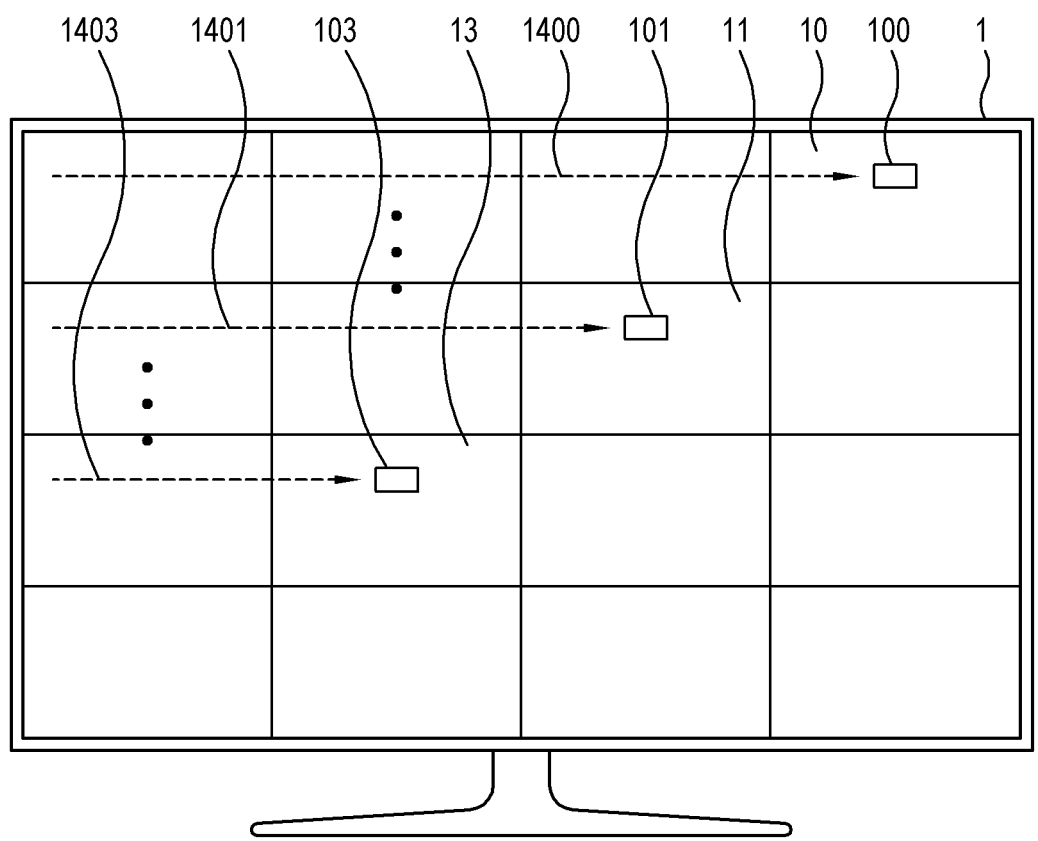
FIG. 14 shows a scanning operation for displaying an image in the display device according to the present disclosure.

FIG. 14 shows a scanning operation for displaying an image in the display device by applying the first coefficient and the second coefficient.

In this exemplary embodiment, the display device 1 uses a progressive scanning method to display an image of one scene by sequentially scanning a screen line by line from a left top to a right bottom, but the scope of the present disclosure is not limited thereto.

That is, the display device 1 sequentially applies the first coefficient of the light source 100 and the second coefficient of the module 10 to the image signal before displaying an image. The display of the image is achieved in a direction of arrows 1400, 1401 and 1403, in such a manner that pixels of one line are all displayed and then pixels of the next line are displayed.

In case of applying the first coefficient, the first coefficient of the light source 100 is applied to the signal before displaying the pixels. On the other hand, in case of applying the second coefficient, the corresponding module 10 is determined according to the positions of the pixel, and then the second coefficient of the determined module 10 is applied to the signal subjected to the second coefficient.

Referring to FIG. 14, the pixels of the image are displayed in sequence along the arrows 1400, 1401 and 1403. To display one among the pixels, the first coefficient of the corresponding light source 100, 101 or 103 is applied to the image signal, and the second coefficient of the module 10, 11 or 13 determined based on the position of the pixel is applied. For illustrative purpose, only three arrows 1400, 1401 and 1403 are shown, but not limited thereto.

The invention claimed is:

1. A display device comprising:
a signal receiver configured to receive an image signal;
a display comprising a plurality of modules, each of the plurality of modules including a plurality of light emitting diodes (LEDs) and storing a coefficient for calibrating the received image signal; and
one or more processors configured to:
control to perform a uniformity calibration on the image signal based on the coefficients respectively stored in the plurality of modules,
identify whether a light output from the plurality of modules is uniform among the plurality of modules,
in response to identifying that the light is not uniform, change the coefficients respectively stored in the plurality of modules and perform again the uniformity calibration on the image signal based on the changed coefficients, and
in response to identifying that the light is uniform, control the display to display the image of the image signal.

2. The display device according to claim 1, wherein the one or more processors are further configured to determine a module to be subjected to the uniformity calibration, among the plurality of modules, based on information about a pixel position of the image.

3. The display device according to claim 1, wherein each of the plurality of modules stores a first coefficient and a second coefficient, the first and second coefficients each corresponding to at least one of brightness and color of the image displayed on the display.

4. The display device according to claim 3, wherein the one or more processors are further configured to receive at least one of the first coefficient and the second coefficient from an external device.

5. The display device according to claim 3, wherein at least one of the first coefficient and the second coefficient is determined based on a light output sensed from the image displayed on the display.

6. The display device according to claim 5, wherein the first coefficient is determined by a light output sensed from a module, to which a LED for determining the first coefficient belongs, among the plurality of modules.

7. The display device according to claim 1, wherein the uniformity calibration is based on a plurality of first coefficients, a number of the plurality of first coefficients corresponding to a number of the plurality of LEDs within each individual module.

8. The display device according to claim 1, wherein the uniformity calibration is based on a plurality of second coefficients, a number of the plurality of second coefficients corresponding to a number of the plurality of modules within the display.

9. The display device according to claim 1, wherein a second coefficient is determined for each module based on a light output sensed from a representative area of each module, a level of the light output sensed in the representative area being used as a reference such that levels of light outputs sensed in other representative areas are equal to the representative area.

10. A method of controlling a display device comprising a display comprising a plurality of modules, each of the plurality of modules including a plurality of light emitting diodes (LEDs) and storing a coefficient for calibrating an image signal, the method comprising:
performing a uniformity calibration on the image signal based on the coefficients respectively stored in each of the plurality of modules;
identifying whether a light output from the plurality of modules is uniform among the plurality of modules,
in response to identifying that the light output is not uniform, changing the coefficients respectively stored in the plurality of modules and performing again the uniformity calibration on the image signal based on the changed coefficients, and
in response to identifying that the light is uniform, displaying the image of the image signal on the display.

11. The method according to claim 10, wherein the performing of the uniformity calibration comprises determining a module to be subjected to the uniformity calibration, among the plurality of modules, based on information about a pixel position of the image.

12. The method according to claim 10, further comprising determining a first coefficient and a second coefficient for each of the plurality of modules, the first and second coefficients each corresponding to at least one of brightness and color of the image displayed on the display.

13. The method according to claim 12, wherein the determining of the first coefficient and the second coefficient comprises receiving at least one of the first coefficient and the second coefficient from an external device.

14. The method according to claim 12, wherein the determining of the first coefficient and the second coefficient comprises determining at least one of the first coefficient and the second coefficient based on a light output sensed from the image displayed on the display.

15. The method according to claim 14, wherein the determining of the first coefficient comprises determining the first coefficient by a light output sensed from a module, to which an LED for determining the first coefficient belongs, among the plurality of modules.

16. The method according to claim 12, wherein the uniformity calibration is based on a plurality of first coefficients, a number of the plurality of first coefficients corresponding to a number of the plurality of LEDs within each individual module.

17. The method according to claim 12, wherein the uniformity calibration is based on a plurality of the second coefficients, a number of the plurality of the second coefficients corresponding to a number of the plurality of modules within the display.

18. The method according to claim 10, wherein a second coefficient is determined for each module based on a light output sensed from a representative area of each module, a level of the light output sensed in the representative area being used as a reference such that levels of light outputs sensed in other representative areas are equal to the representative area.

\* \* \* \* \*